United States Patent [19]

Chmela et al.

[11] 4,423,551

[45] Jan. 3, 1984

[54] PIZZA CUTTING AND SERVING UTENSIL

[75] Inventors: John F. Chmela, Mt. Prospect; Carl R. Fletcher, Arlington Heights; Norton Sarnoff, Northbrook, all of Ill.

[73] Assignee: Ensar Corporation, Wheeling, Ill.

[21] Appl. No.: 375,809

[22] Filed: May 7, 1982

[51] Int. Cl.³ .............................................. A47J 43/28

[52] U.S. Cl. .......................................... 30/142; 294/7; 30/124; 30/307

[58] Field of Search ................. 30/124, 142, 299, 307; 294/7

[56] References Cited

U.S. PATENT DOCUMENTS

| | | | |
|---|---|---|---|
| 1,528,615 | 3/1925 | Janecek | 30/307 |
| 2,322,046 | 6/1943 | Miller | 30/124 |
| 2,938,267 | 5/1960 | Tupper | 30/142 |
| 3,174,223 | 3/1965 | Gerson | 30/307 X |

*Primary Examiner*—Jimmy C. Peters
*Attorney, Agent, or Firm*—Lee, Smith & Jager

[57] ABSTRACT

An improved utensil for cutting pizza or the like is disclosed having a sharpened cutting wheel and a planar blade with a sharpened edge, the edges of both the wheel and blade are aligned so that the cutting paths traversed by each coincide. The pizza crust edges and the pizza body can then be cut respectively by the blade and cutter wheel in one cutting stroke across the pizza. The blade end further includes angled corners for completely separating the pizza at the pan corners. The planar blade is of sufficient width to hold a piece of pizza thereon for serving, and includes a serrated cutting edge to aid in inserting the blade between the pizza and the pan.

12 Claims, 6 Drawing Figures

PIZZA CUTTING AND SERVING UTENSIL

BACKGROUND OF THE INVENTION

The invention relates generally to household utensils and particularly to the type of utensil used in cutting and serving pizzas or the like.

Foodstuffs such as pizza have a consistency which is not easily cut by a table knife. Because of the melted cheese covering, a roller type of cutter is better adapted to section pizza into pieces. The downward pressure applied to a roller cutter is effective to cut a pizza without pulling the cheese topping along the cutting path as does a knife.

In instances where the pizza food stuff is baked in a pan, of either the deep of shallow type, a wheel-type cutter is ineffective to completely separate the pieces at the corners where the bottom of the pan joins the sides. In this event a spatula or server may too limber or not configured to reach into the pan corners, and thus, another household utensil, e.g. a knife, must be employed to completely separate the pizza pieces at the corners. Also, a knife is generally the better utensil to cut the edges of the pizza crust where the cheese becomes tougher than that of the pizza body. The sawing action of the knife is better adapted to cut the pizza edges than the downward pressure of the roller cutter.

However, once a pizza is cut, yet another utensil, such as a spatula or server, is generally needed to serve the individual pieces. This is especially true since pizza is generally served shortly after it has been subjected to high temperatures during baking or reheating.

It is evident that there is a need for a single utensil which can cut the crust edges, then the corner and body parts of the pizza, and then serve the pieces thereon. Therefore, an object of the invention is to provide a single utensil which can perform these various operations.

It is a further object of the invention to so arrange the various cutting edges and surfaces of the utensil so that the cutting operations can be carried out in easy, smooth strokes.

SUMMARY OF THE INVENTION

In accordance with the objects of the invention there is provided a utensil with a knife-like edge for cutting the crust edge of a pizza, a roller cutter in alignment with the knife-like edge for cutting the pizza body, a sharp corner for cutting the pieces at the pan corners and a planar surface for serving pieces of pizza thereon.

In the preferred embodiment of the invention, there is provided a second knife-like edge which is serrated. This serrated edge extends along one edge of the planar surface and is effective in enabling the planar surface to be forced under a pizza piece to separate it from the baking pan.

The roller cutter, one knife edge and a sharp corner are arranged so that when the handle of the utensil is grasped, and in one stroke across the pizza, the crust edge is first cut by the knife edge, the pizza body is cut by the roller cutter, and then the crust edge of the other side of the pizza is similarly cut with the knife edge. Without removing the utensil, the corner of the crust in then cut with the sharp corner of the utensil, whereupon the utensil corner or the roller cutter then traverses the first cutting path to assure a complete cut in the body of the pizza, and the pizza crust corner nearest the operator is then cut. After a series of such strokes the pizza can be cut into pieces which can then be separated from the pan by the serrated edge and lifted out of the pan by the planar surface and served.

Other features and advantages of the invention will become apparent as the following description proceeds in conjunction with the accompanying drawings.

DETAILED DESCRIPTION OF THE PREFERRED EMBODIMENT

Figures 1, 2, 3, 4, 5, 6:
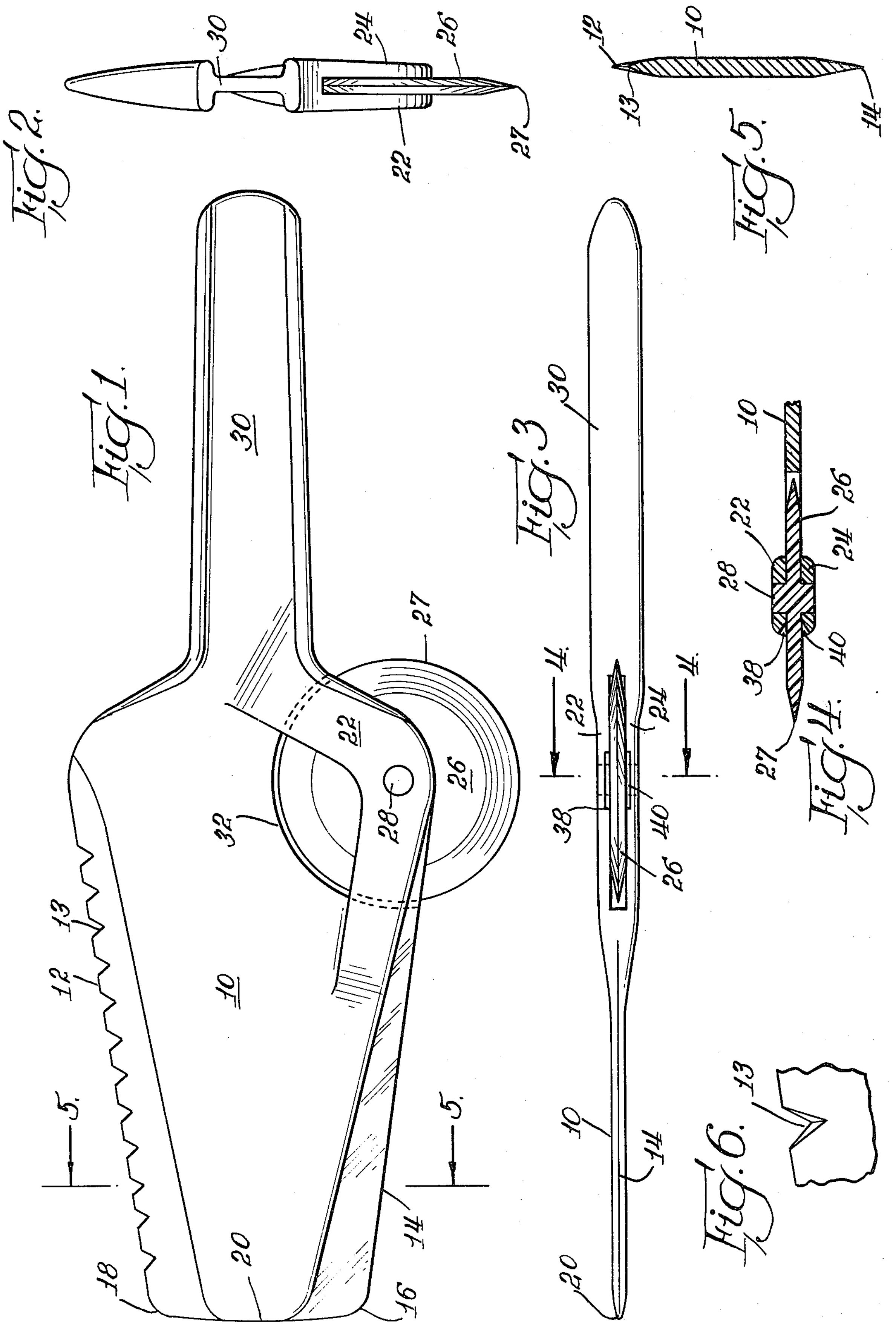
FIG. 1 is a side elevational view of the pizza cutting and serving utensil constructed in accordance with the invention.
FIG. 2 is an end elevational view looking in at the handle end of the utensil.
FIG. 3 is a bottom plan view of the utensil.
FIG. 4 is a cross-sectional view of a portion of the utensil taken substantially along line 4—4 of FIG. 3 and showing the journal support bearing for the cutting wheel.
FIG. 5 is a cross-sectional view of another portion of the utensil taken substantially along line 5—5 of FIG. 1 and showing the serrated and fixed cutting edges at the respective top and bottom of the utensil.
FIG. 6 is an enlarged perspective view of one of the serrations at the top cutting edge of the utensil.

Turning now to the drawings, and particularly FIG. 1, there is illustrated the pizza cutting utensil embodying the features of the present invention.

The pizza cutting utensil includes a planar blade portion 10 with a width sufficient to hold a piece of pizza thereon. Extending substantially the length of one edge of the blade is a knife-like edge 12 with a plurality of serrations 13. The other elongate edge of the planar surface is also constructed with a knife-like edge, but extending only from the cutter end 20 to about the middle of the edge. The end corners 16 and 18 of the planar blade are sufficiently sharp and angled to fit within the corners of conventional pizza pans. The end 20 of the planar blade is also sharpened to aid in sliding the cutter utensil under a slice of pizza.

The pizza cutter utensil further includes a bifurcated yoke with a pair of planar furcations, one such furcation 22 shown in FIG. 1. To eliminate surface irregularities the outer surfaces of the furcations blend into the surface of the planar blade portion 10. This aspect allows the blade portion as well as the bifurcated yoke to be slid completely under a piece of pizza to be served. A cutting wheel 26 is axially journalled for rotation in a bearing within each furcation. The journal bearing is disposed within each furcation such that the peripheral edge 27 of the cutting wheel extends transversely beyond the fixed edge 14 of the planar blade.

The base of the planar blade portion 10 is connected to a handle portion 30. The base portion further includes a circularly hollowed portion 32 to accommodate the cutting wheel 26.

In accordance with one feature of the invention, the cutting wheel 26 is aligned with the fixed cutting edge 14 so that, in one forward stroke of the utensil, the fixed cutting edge 14 is operative to cut the pizza crust edge, and then the wheel 26 is operative to continue the cut across the body of the pizza. Upon approaching the other end of the pizza, the utensil is oriented so that the fixed blade 14 comes in contact with the other pizza crust edge, while at the same time the wheel 26 finishes the cut through the pizza body. At this point in the slicing operation, and without removing the cutting utensil from the pizza, the utensil handle 30 is oriented into a more vertical position where, in the backward cutting stroke, the planar blade corner 16 first effects a cut in the pizza crust corner, the original cutting path is traversed to assure a thorough cut, and then a cut is completed in the corner of the pizza nearest the operator by utensil corner 16. Subsequent forward and backward cutting strokes are made to divide the pizza into other pieces.

It should now be appreciated that by use of the utensil construction just described, the individual pieces of pizza are completely and quickly separated one from the other. Moreover, a single utensil having this arrangement of cutting edges greatly simplifies the cutting operation.

After the pizza has been cut into the desired number of pieces, the first piece thereof may be served by inserting the end 20 of the planar blade under the piece and lifting it out of the pan. Subsequent pieces may be similarly served, or the serrated fixed edge 12 may be slid between the pizza crust and pan to separate the two. The planar blade 10 is then effective to lift the piece from the pan and serve such piece.

It should be realized that those skilled in the art may prefer to utilize serrations in the fixed cutting edge 14. FIG. 6 illustrates the character of each serration 13 having a chamfered edge to facilitate cutting through a tough edge of a pizza.

With reference back to FIG. 1 each planar furcation has an opening for exposing a portion of the cutting wheel. These openings, one shown at 32, facilitate cleaning the wheel. Also, should food particles be trapped between the furcation during the roller cutting operation, such particles can be expelled through the opening and thereby prevent an accumulation of food particles between the furcation and the wheel.

FIG. 2 shows an end view of the pizza cutting utensil taken from the handle end. Specifically, the planar furcations 22 and 24 are spaced apart just enough to accommodate the width of the roller wheel 26. This close spacing allows the furcation edges to scrape food particles from the radial surface of the cutting wheel. For the reason that the furcation edges are constructed to scrape the radial surface of the cutting wheel, the wheel thickness is maintained uniform throughout its diameter except at the peripheral cutting edge 27. The peripheral edge 27 of the cutting wheel is sharpened such that downward pressure from the handle 30 causes the rotary cutting edge 27 to penetrate the pizza crust. The cutting wheel 26, being located at the base of the blade portion 10, permits the leverage on the handle to be transferred to downward pressure on the cutting wheel thereby reducing the tendency of the handle to rotate about the cutting wheel axle 28.

Because of its simplicity, the utensil can be economically molded out of a nylon type of plastic. Futhermore, since the cutting wheel 26 does the majority of cutting, and must be rugged, a white nylon type of plastic is preferable. Moreover, it has been found that the use of such a plastic material for the cutting wheel prevents the pizza topping from sticking to the wheel during the cutting process. Metals could of course be used in the construction of the utensil.

FIG. 2 illustrates the I-shaped configuration of the handle 30. The I-shaped structure adds strength to the handle, and also provides a wider grip so as to reduce fatigue and strain of one's hand while performing the cutting operation. Viewing FIG. 1 in conjunction with FIG. 3, to add rigidity to the handle portion the I-configuration extends into the upper edge of the blade 10 and into each furcation.

Considering now the pliable nature of the cutting utensil, attention should be directed to FIG. 3 where it is seen that the thickness of the cutting utensil generally decreased from the handle end to the blade end. It should be realized that the thickness of the cutting utensil along its length is inversely proportional to the flexibility thereat. This is in keeping with the various features of the invention as it is desired that the handle end be relatively rigid while yet maintaining the blade 10 portion somewhat flexible. The I-shaped handle configuration stiffens the handle 30 and affords a strong transition from the handle to the blade portion. The furcated yoke portion is wider than the blade 10 portion to accommodate the cutting wheel 26. The remaining portions of the blade 10 are of uniform thickness as shown in the cross-sectional view of FIG. 5. It is desired that the blade section be relatively thin and somewhat flexible so that it can be slid under a piece of pizza and the handle flexed somewhat upwardly to prevent the fingers of the operator from touching the bottom of the pizza pan. Therefore, the pizza cutting utensil according to the preferred embodiment is constructed to afford strength near the handle end yet provide flexibility toward the blade end.

FIG. 5 further illustrates the fixed cutting edges 12 and 14 tapered to knife-like edges. The end 20 of the blade portion is somewhat tapered to a knife-like edge to facilitate slipping the blade portion of the utensil between a piece of pizza and the pan.

FIG. 4 is a partial cross-sectional view taken along line 4—4 of FIG. 3. Viewing FIGS. 3 and 4 collectively, it should be observed that the inner edge of each furcation is bevelled. The bevelled portions, indicated at 38 and 40, allow the journal 28 of the cutting wheel to be installed within the furcation bearings without the need of a special tool for prying the furcations apart. The installation of the cutting wheel 36 into the bifurcated yoke is accomplished by aligning each end of the cutting wheel journal 28 with the bevelled part of each furcation, then simply forcing the wheel in the direction of the bearing openings located in the furcations. Once the cutting wheel is snapped into place it becomes permanently fixed to the cutting utensil. Also, the cutting wheel journal shaft ends are flush with the outside surface of the furcations.

In summary, a pizza cutting utensil has been disclosed which includes a knife-like cutting edge aligned with a cutting wheel, and a planar blade portion with sharpened corners. The arrangement of the various cutting edges and the unique construction of the cutting utensil provide all the elements necessary for completely slicing a pizza into pieces and serving the pieces.

The foregoing describes the fundamental features of the invention as applied to the disclosed embodiment. It should be understood that various omissions, substitutions, and changes in form and detail may be made by those skilled in the art without departing from the spirit and scope of the invention. Therefore, it is the intention to be limited only by the scope of the following claims.

What we claim is:

1. A utensil for cutting and serving pizza or the like, comprising:

a handle;

a cutting wheel;

a blade having sufficient width and length to hold thereon a piece of pizza or the like, and having formed as a part thereof (i) a knife-like edge along one elongate edge thereof, and (ii) a bifurcated yoke with a pair of planar furcations between which said cutting wheel is journaled for rotation and thus disposed coplanar with said blade, each said furcation being smoothly merged into and forming a part of the blade surface whereby the serving surfaces of said utensil are continuous and effective as a server irrespective of which planar side thereof said pizza or the like is served.

2. The utensil of claim 1 wherein said furcations are disposed somewhat midway between the end of said blade and the end of said handle.

3. The utensil of claim 2 wherein the elongate edges of said blade portion are tapered toward the end of said blade portion, and said pair of furcations are disposed proximate the base of said blade.

4. The utensil of claim 1 wherein said handle is molded integral to said blade portion out of a flexible type of plastic, and said cutting wheel is constructed of a rigid type of plastic.

5. The utensil of claim 1 wherein said cutting wheel includes an axle journaled in each said furcation, the ends of said axle being disposed below the outer surface of each said furaction so as to preserve the continuity of smooth surface of said blade.

6. The utensil of claim 5 wherein each said furcation includes on the inner surface thereof a bevelled portion extending from near where said cutting wheel is journaled for rotation and outwardly toward the edge of each said furcation, whereby the installation of said cutting wheel between said furcations is facilitated.

7. The utensil of claim 1 wherein said utensil is constructed in such a manner that said pizza or the like can be served on either side of said blade.

8. A utensil for cutting and serving foodstuffs, comprising:

a handle portion;

a sharpened cutting wheel with a journal; and a generally planar elongate body portion for serving foodstuffs, said body portion having opposing elongate edges, a base integral to said handle, and an end, one elongate edge thereof having a knife-like cutting edge, and within the other elongate edge a slit forming a bifurcated yoke portion with bearings for rotation therein of said cutting wheel in planar alignment with said body portion;

whereby foodstuffs can be partially sectioned in one cutting stroke with said cutting wheel and said knife-like cutting edge, and the resulting sectioned pieces served on the planar body portion.

9. The utensil of claim 8 wherein said bifurcated yoke portion is disposed in the base of said body portion.

10. The utensil of claim 8 wherein the elongate edges of said body portion are tapered toward the end of said body portion.

11. The utensil of claim 8 wherein said handle and said body portion are integrally formed of plastic, and wherein the width of said utensil decreases in a direction such that the flexibility of the utensil generally increases from the handle end to the end of said body portion.

12. The utensil of claim 8 wherein said cutting wheel is constructed of a rigid plastic and said handle and said body portion are constructed of a flexible type of plastic.

* * * * *